(12) United States Patent
Masaoka (10) Patent No.: US 8,352,973 B2
(45) Date of Patent: Jan. 8, 2013

(54) DISK AND DISCHARGE SLIDER APPARATUS (75) Inventor: Kengo Masaoka, Ehime (JP)

(73) Assignee: Panasonic Corporation, Osaka (JP)

( * ) Notice: Subject to any disclaimer, the term of this patent is extended or adjusted under 35 U.S.C. 154(b) by 1101 days.

(21) Appl. No.: 12/162,587

(22) PCT Filed: Jan. 19, 2007

(86) PCT No.: PCT/JP2007/050825
§ 371 (c)(1),
(2), (4) Date: Nov. 3, 2008

(87) PCT Pub. No.: WO2007/088740
PCT Pub. Date: Aug. 9, 2007

(65) Prior Publication Data
US 2009/0178067 A1 Jul. 9, 2009

(30) Foreign Application Priority Data
Feb. 3, 2006 (JP) ................................. 2006-026566

(51) Int. Cl.
G11B 17/04 (2006.01)
(52) U.S. Cl. ..................................................... 720/622
(58) Field of Classification Search ........... 720/617–626
See application file for complete search history.

(56) References Cited

U.S. PATENT DOCUMENTS

| 2005/0039200 | A1 | 2/2005 | Fujimura |
| 2005/0102689 | A1* | 5/2005 | Saji et al. ...................... 720/619 |
| 2005/0141356 | A1 | 6/2005 | Fujisawa |
| 2007/0297297 | A1 | 12/2007 | Wada |
| 2008/0148301 | A1 | 6/2008 | Masaoka |

FOREIGN PATENT DOCUMENTS

| JP | 2002-352498 | 12/2002 |
| JP | 2005-100595 | 4/2005 |
| JP | 2005-190555 | 7/2005 |
| JP | 2005-302188 | 10/2005 |
| JP | 2005-327431 | 11/2005 |
| JP | 2006-179078 | 7/2006 |

OTHER PUBLICATIONS

International Search Report dated Feb. 20, 2007.
Japanese Office Action dated Mar. 3, 2009 with English translation.

* cited by examiner

Primary Examiner — Nathan Danielsen
(74) Attorney, Agent, or Firm — Dickinson Wright PLLC (57) ABSTRACT According to the slot-in type disk apparatus, the discharge slider 106 is constituted by a main discharge slider 106 and a sub-discharge slider 106, first load means 106C and second load means 106X, 106Y are given to the main discharge slider 106 and the sub-discharge slider 106, when a load in a direction in which the disk is pushed in is applied to the discharge lever 100 when the disk is discharged, a load caused by the second load means 106X, 106Y is applied to the main discharge slider 106 and the sub-discharge slider 106, and load caused by the first load means 106C is after the load caused by the second load means 106X, 106Y is released.

2 Claims, 4 Drawing Sheets

DISK AND DISCHARGE SLIDER APPARATUS

TECHNICAL FIELD

The present invention relates to a disk apparatus for recording or replaying into or from a disk-like recording medium such as a CD and a DVD, and more particularly, to a slot-in type disk apparatus into which and from which a disk can directly be inserted or discharged.

BACKGROUND TECHNIQUE

According to a conventional disk apparatus, there is widely employed a loading system in which a disk is placed on a tray or a turntable, and the tray or the turntable is loaded into an apparatus body. According to such a loading system, since the tray or the turntable is required, there is a limit to reduce the thickness of the disk apparatus body.

Therefore, there recently exists a so-called slot-in type disk apparatus in which a disk is directly operated by a lever or the like using a loading motor.

According to such a slot-in type disk apparatus, however, although the disk apparatus body can be reduced in thickness and size, since a disk is inserted and discharged by a mechanism which is driven by the loading motor, if a load is applied in a direction in which the disk is pushed in when the disk is discharged, there is a problem that a member constituting the mechanism which is driven by the loading motor is damaged by the load applied to the disk (patent document 1).

In a slot-in type disk apparatus having a driving mechanism which operates a disk, in order to solve the problem that the member is damaged when a load in the direction in which a disk is pushed in is applied when the disk is discharged, there is proposed to unlock a link arm (patent document 2).

[Patent Document 1] Japanese Patent Application Laid-open No. 2002-352498

[Patent Document 2] Japanese Patent Application Laid-open No. 2005-100595

DISCLOSURE OF THE INVENTION

Problem to be Solved by the Invention

The conventional technique disclosed in patent document 2 has a problem that although it is possible to prevent the member from being damaged, a disk can not be returned smoothly when the load in the pushing direction of the disk is removed.

Hence, it is an object of the present invention to provide a slot-in type disk apparatus in which when a load in a pushing direction of a disk is added when the disk is discharged, a returning motion when the load is removed can be carried out smoothly without damaging a member constituting a mechanism which is driven by a loading motor.

Means for Solving the Problem

A first aspect of the present invention provides a slot-in type disk apparatus in which a base body and a lid constitute a chassis sheath, a disk-insertion opening into which a disk is directly inserted is formed in a front surface of the chassis sheath, a traverse base is disposed on a front surface side of the base body, a main slider is provided with a cam mechanism which displaces the traverse base, the main slider is disposed such that its one end is on the front surface side of the base body and the other end is on a rear surface side of the base body, a discharge slider is provided in parallel to the main slider, the main slider and the discharge slider are connected to each other through a link arm, and a discharge lever is in association with motion of the main slider through the discharge slider, wherein the discharge slider is constituted by a main discharge slider and a sub-discharge slider, first load means and second load means are given to the main discharge slider and the sub-discharge slider, when a load in a direction in which the disk is pushed in is applied to the discharge lever when the disk is discharged, a load caused by the second load means is applied to the main discharge slider and the sub-discharge slider, and a load caused by the first load means is applied to the main discharge slider and the sub-discharge slider after the load caused by the second load means is released.

According to a second aspect of the invention, in the slot-in type disk apparatus of the first aspect, the main discharge slider and the sub-discharge slider can slide in a longitudinal direction, the main discharge slider and the sub-discharge slider are biased in a direction in which they attract each other by the first load means, and the main discharge slider and the sub-discharge slider are formed with engaging portions, thereby constituting the second load means.

A third aspect of the invention provides a slot-in type disk apparatus in which a base body and a lid constitute a chassis sheath, a disk-insertion opening into which a disk is directly inserted is formed in a front surface of the chassis sheath, a traverse base is disposed on a front surface side of the base body, a main slider and a sub-slider are provided with cam mechanisms which displace the traverse base, the main slider is disposed such that its one end is on the front surface side of the base body and the other end is on a rear surface side of the base body, a discharge slider is provided in parallel to the main slider, the main slider and the discharge slider are connected to each other through a link arm, and a discharge lever is in association with motion of the main slider through the discharge slider, wherein the discharge slider is constituted by a main discharge slider and a sub-discharge slider, the main discharge slider and the sub-discharge slider can slide in a longitudinal direction, the main discharge slider and the sub-discharge slider are formed with engaging portions, thereby constituting load means, and when a load in a direction in which the disk is pushed in is applied to the discharge lever when the disk is discharged, a load caused by the load means is applied to the main discharge slider and the sub-discharge slider.

According to a fourth aspect of the invention, in the slot-in type disk apparatus of the third aspect, a separated state between the main discharge slider and the sub-discharge slider is brought into a fitted state between the main discharge slider and the sub-discharge slider by abutting the main discharge slider against another member such as the traverse base.

Effect of the Invention

According to the present invention, the main discharge slider and the sub-discharge slider are not separated from each other by a slight load applied when the disk is discharged, and when the load in the pushing direction of the disk is applied when the disk is discharged, the main discharge slider and the sub-discharge slider are separated from each other so that a member such as the discharge slider is prevented from being damaged. With the invention, the returning motion when the load is removed can be carried out smoothly.

BRIEF DESCRIPTION OF THE DRAWINGS

FIG. 3 is a perspective view showing a motion state of the discharge slider when a disk is forcibly pushed in;

EXPLANATION OF SYMBOLS 10 base body
11 disk-insertion opening
30 traverse base
40 main slider
100 discharge lever
106 discharge slider
106A main discharge slider
106B sub-discharge slider
106C spring (first load means)
106X engaging portion (second load means)
106Y engaging portion (second load means)

BEST MODE FOR CARRYING OUT THE INVENTION

According to the disk apparatus of the first aspect of the invention, the discharge slider is constituted by a main discharge slider and a sub-discharge slider, first load means and second load means are given to the main discharge slider and the sub-discharge slider, when a load in a direction in which the disk is pushed in is applied to the discharge lever when the disk is discharged, a load caused by the second load means is applied to the main discharge slider and the sub-discharge slider, and a load caused by the first load means is applied to the main discharge slider and the sub-discharge slider after the load caused by the second load means is released. According to the embodiment, when a load in the disk-pushing direction is applied when the disk is discharged, since the main discharge slider and the sub-discharge slider are separated from each other, it is possible to prevent a member such as the discharge slider from being damaged. Further, the second load means is provided in addition to the first load means as a load for separating the main discharge slider and the sub-discharge slider from each other. Thus, it is possible to constitute such a structure that the main discharge slider and the sub-discharge slider are not separated from each other by a slight load applied when the disk is discharged.

According to the second embodiment, in the slot-in type disk apparatus of the first aspect, the main discharge slider and the sub-discharge slider can slide in a longitudinal direction, the main discharge slider and the sub-discharge slider are biased in a direction in which they attract each other by the first load means, and the main discharge slider and the sub-discharge slider are formed with engaging portions, thereby constituting the second load means. With this aspect, the second load comprises the engaging portion, the main discharge slider and the sub-discharge slider are not separated when a light load such as surface friction or variation in size of the disk is applied, and the disk can reliably be discharged.

According to the disk apparatus of the third aspect of the invention, the discharge slider is constituted by a main discharge slider and a sub-discharge slider, the main discharge slider and the sub-discharge slider can slide in a longitudinal direction, the main discharge slider and the sub-discharge slider are formed with engaging portions, thereby constituting load means, and when a load in a direction in which the disk is pushed in is applied to the discharge lever when the disk is discharged, a load caused by the load means is applied to the main discharge slider and the sub-discharge slider. With this aspect, the load means comprises the engaging portion, the main discharge slider and the sub-discharge slider are not separated when a light load such as surface friction or variation in size of the disk is applied, and the disk can reliably be discharged.

According to the fourth embodiment, in the slot-in type disk apparatus of the third aspect, a separated state between the main discharge slider and the sub-discharge slider is brought into a fitted state between the main discharge slider and the sub-discharge slider by abutting the main discharge slider against another member such as the traverse base. With this aspect, the returning motion when the load in the disk-pushing direction is removed can be carried out smoothly without providing a spring or the like.

Embodiment 1

A disk apparatus according to an embodiment of the present invention will be explained.

Figure 1:
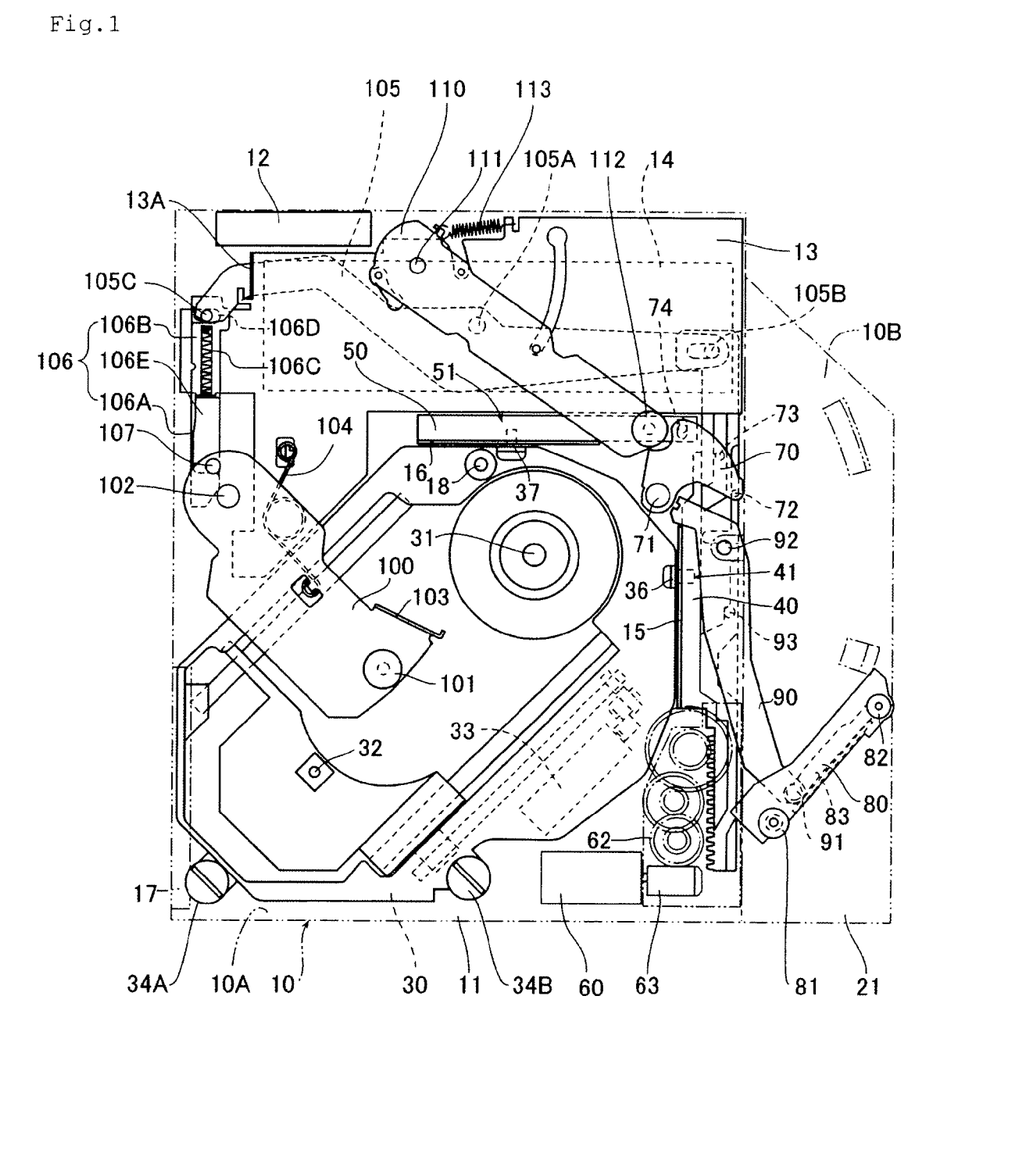
FIG. 1 is a plan view of a base body of a disk apparatus according to an embodiment of the present invention.
Figure 2:
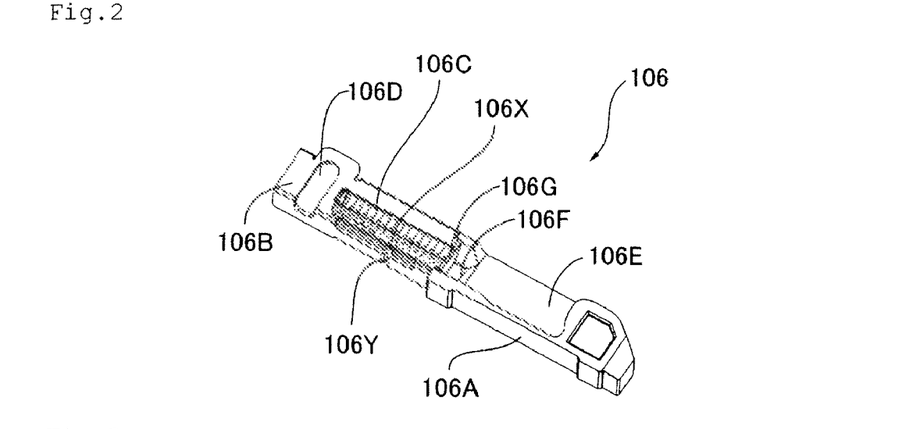
FIG. 2 is a perspective view showing a normal state of a discharge slider of the disk apparatus.
Figure 3:
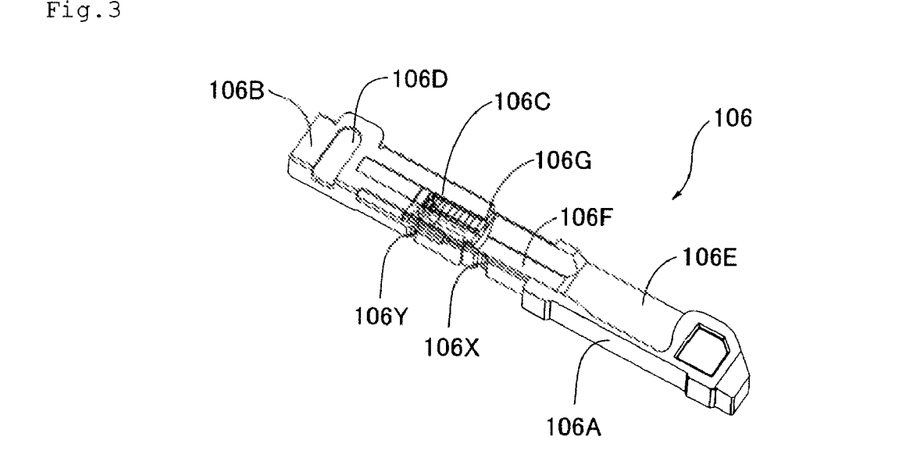
Figure 4:
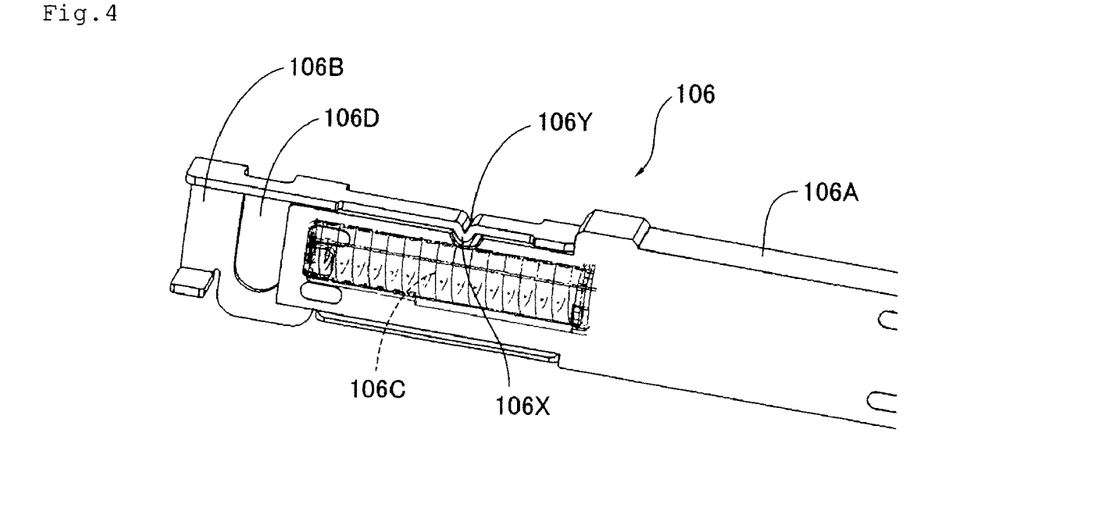
FIG. 4 is a perspective view of an essential portion of the discharge slider.

FIG. 1 is a plan view of a base body of a disk apparatus according to an embodiment of the present invention. FIG. 2 is a perspective view showing a normal state of a discharge slider of the disk apparatus. FIG. 3 is a perspective view showing a motion state of the discharge slider when a disk is forcibly pushed in. FIG. 4 is a perspective view of an essential portion of the discharge slider.

According to the disk apparatus of the embodiment, a base body and lid constitute a chassis sheath, and a bezel is attached to a front surface of the chassis sheath. The disk apparatus of the embodiment is a slot-in type disk apparatus in which a disk is directly inserted from a disk-insertion opening formed in the bezel.

As shown in FIG. 1, parts which realize the recording and replaying function onto or from a disk and a loading function of a disk are attached to the base body 10.

The base body 10 is formed with a deep bottom 10A and a shallow bottom 10B with respect to a lid. A wing portion extending from a front surface to a rear surface is formed by the shallow bottom 10B.

The base body 10 is formed at its front side with a disk-insertion opening 11 into which a disk is directly inserted, and a connector 12 is disposed on an end of a rear surface of the base body 10. A traverse base 30 is disposed on the base body 10 on the side of the disk-insertion opening 11, and a rear base 13 is disposed on the base body 10 on the side of the connector 12. The traverse base 30 and the rear base 13 are disposed such that they are not superposed on each other. A printed board 14 is provided on the rear base 13 on the side of the surface of the base body 10.

The traverse base 30 holds a spindle motor 31, a pickup 32 and driving means 33 which moves the pickup 32. The spindle motor 31 is provided on the one end side of the traverse base 30, and the pickup 32 is provided such that the pickup 32 can move from one end to the other end of the traverse base 30. When the pickup 32 is on standby, the pickup 32 is disposed on the other end side of the traverse base 30.

In the traverse base 30, the spindle motor 31 is located at a central portion of the base body 10, a reciprocating range of the pickup 32 is located closer to the disk-insertion opening 11 than the spindle motor 31, and the reciprocating direction of the pickup 32 is different from the insertion direction of the disk. Here, an angle of 40° to 45° is formed between the reciprocating direction of the pickup 32 and the insertion direction of a disk.

The traverse base 30 is supported on the base body 10 by a pair of insulators 34A and 34B.

It is preferable that the pair of insulators 34A and 34B are disposed closer to the stationary position of the pickup 32 than the spindle motor 31, and is closer to the position of the pickup 32 on the side of the disk-insertion opening 11 than the standby position of the pickup 32. In this embodiment, the insulator 34A is provided on the side of one end near an inner side of the disk-insertion opening 11, and the insulator 34B is provided at a central portion near the inner side of the disk-insertion opening 11. The insulators 34A and 34B include damper mechanisms made of elastic materials. The insulators 34A and 34B can displace in a direction in which the traverse base 30 can separated from the base body 10 by these damper mechanisms. Thus, the traverse base 30 brings the spindle motor 31 toward and away from the base body 10 around the insulators 34A and 34B as fulcrums.

A main slider 40 and a sub-slider 50 having cam mechanisms for moving the traverse base 30 will be explained.

The cam mechanisms which displace the traverse base 30 are respectively provided on the main slider 40 and the sub-slider 50. The main slider 40 and the sub-slider 50 are disposed on the side of the spindle motor 31. The main slider 40 is disposed such that its one end comes on the side of a front surface of the base body 10 and its other end comes on the side of a rear surface of the base body 10. The sub-slider 50 is disposed between the traverse base 30 and the rear base 13 in a direction perpendicular to the main slider 40.

The cam mechanisms which displace the traverse base 30 comprise a first cam mechanism 41 and a second cam mechanism 51. The first cam mechanism 41 is provided on a surface of the main slider 40 on the side of the spindle motor 31, and the second cam mechanism 51 is provided on the sub-slider 50 on the side of the spindle motor 31.

A base member 15 is provided between the main slider 40 and the traverse base 30. A base member 16 is provided between the sub-slider 50 and the traverse base 30. The base member 15 and the base member 16 are fixed to the base body 10. A position of a cam pin 36 of the traverse base 30 is limited by a vertical groove formed in the base member 15, and a position of the cam pin 37 of the traverse base 30 is limited by a vertical groove formed in the base member 16.

The base member 16 and the sub-slider 50 are connected to each other through a third cam mechanism (not shown in FIG. 1). The third cam mechanism has a function for moving the sub-slider 50 away from the base body 10 when the traverse base 30 is moved away from the base body 10 by the second cam mechanism 51.

A loading motor 60 is disposed on one end side of the main slider 40, and the loading motor 60 and one end of the main slider 40 are connected to each other through a gear mechanism.

A drive shaft of the loading motor 60 is provided with a gear 63, worm gear cluster 62 which meshes the gear 63 is provided and a gear cluster is constituted.

By driving the loading motor 60, the main slider 40 can slide in the longitudinal direction. The main slider 40 is connected to the sub-slider 50 by a cam lever 70.

The cam lever 70 includes a turning fulcrum 71, a pin 72, a pin 73 and a pin 74. The pins 72 and 73 engage with a cam groove formed in an upper surface of the main slider 40, and the pin 74 engages a cam groove formed in an upper surface of the sub-slider 50.

The cam lever 70 moves the sub-slider 50 with timing when the traverse base 30 is displaced by the first cam mechanism 41 of the main slider 40, the second cam mechanism 51 is moved by movement of the sub-slider 50, and the traverse base 30 is displaced.

The above-explained connector 12, traverse base 30, rear base 13, printed board 14, insulators 34A and 34B, main slider 40, sub-slider 50, the base member 15, the base member 16 and loading motor 60 are provided on the deep bottom 10A of the base body 10, and form a disk inserting space between these members and the lid.

Next, a guide member for supporting a disk when the disk is to be inserted, and a lever member which operates when a disk is inserted will be explained below.

A first disk guide 17 having a predetermined length is provided on the side of one end of the deep bottom 10A near the disk-insertion opening 11. The first disk guide 17 has a groove having a U-shaped cross section as viewed from the disk inserting side. A disk is supported by this groove.

A pull-in lever 80 is provided in the base body 10 on the other end side of the disk-insertion opening 11. A second disk guide 81 is provided on a movable side end of the pull-in lever 80. The second disk guide 81 comprises a cylindrical roller, and is turnably provided on the movable end of the pull-in lever 80. A groove is formed in a roller outer periphery of the second disk guide 81, and a disk is supported by this groove.

The movable end of the pull-in lever 80 is operated closer to the disk-insertion opening 11 than the stationary side. The pull-in lever 80 has a turning fulcrum 82 on the stationary end.

A long groove 83 is provided between a movable end and a stationary end of a back surface (surface on the side of the base body 10) of the pull-in lever 80.

The pull-in lever 80 is operated by a sub-lever 90.

The sub-lever 90 has a projection 91 on the movable side one end, and a turning fulcrum 92 on the other end. The projection 91 of the sub-lever 90 slides in a long groove 83 in the pull-in lever 80. The turning fulcrum 92 of the sub-lever 90 is located on the main slider 40. The turning fulcrum 92 is not operated in association with the main slider 40, and is fixed to the base body 10 through the base member 15. A pin 93 is provided on a lower surface of the sub-lever 90 at a location closer to the projection 91 than the turning fulcrum 92. The pin 93 slides in the cam groove formed in an upper surface of the main slider 40. Therefore, the angle of the sub-lever 90 is changed as the main slider 40 moves, and if the angle of the sub-lever 90 is changed, the turning angle of the pull-in lever 80 is changed. That is, the second disk guide 81 of the pull-in lever 80 moves toward and away from the spindle motor 31 by the operation of the sub-lever 90.

A discharge lever 100 is provided on a side of the base body 10 which is different from the pull-in lever 80. A guide 101 is provided on a movable side end on the side of one end of the discharge lever 100. A turning fulcrum 102 is provided on the other end of the discharge lever 100. An abutment portion 103 is provided on the movable side end of the discharge lever 100 on the side of a rear surface as compared with the guide 101. The discharge lever 100 is provided with an elastic body 104. One end of the elastic body 104 is fixed to the discharge lever 100, and the other end is fixed to the rear base 13. When the abutment portion 103 is pulled toward the rear surface by the elastic body 104, the abutment portion 103 abuts against an abutment portion 13A of the rear base 13. The discharge lever 100 is pulled out toward the disk-insertion opening 11 by elastic force of the elastic body 104. The discharge lever 100 is operated in association with the main slider 40 through a link arm 105 and a discharge slider 106.

Here, the link arm 105 is turnably provided on the rear base 13 by the shaft 105A, one end of the link arm 105 is connected to the main slider 40 through a pin 105B, and the other end is connected to a hole 106D of the discharge slider 106 through the pin 105C. The discharge lever 100 is engaged with a cam groove 106E of the discharge slider 106 through a cam pin 107. One end of the discharge slider 106 is disposed on the side of the front surface of the base body 10, and the other end is disposed on the side of the rear surface of the base body 10. The main slider 40 is provided on one of sides of the deep bottom 10A of the base body 10, and the discharge slider 106 is provided on the other side of the deep bottom 10A of the base body 10. Therefore, the main slider 40 and the discharge slider 106 are in parallel to each other. The end of the main slider 40 on the side of the rear surface and the end of the discharge slider 106 on the side of the rear surface are engaged with the link arm 105.

A restriction lever 110 is provided on the side of a rear surface of the base body 10. An end of the restriction lever 110 on the side of its rear surface is a turning fulcrum 111, and an end of the restriction lever 110 on the movable side has a guide 112. The side of the guide 112 of the restriction lever 110 is always biased such as to project toward the front side by an elastic body 113. The restriction lever 110 operates a limit switch at a predetermined position. That is, if a disk is inserted to a predetermined position, the limit switch is turned OFF, and the loading motor 60 is driven. If the loading motor 60 is driven, the main slider 40 slides.

Next, a structure of the discharge slider 106 will be explained using FIGS. 2 to 4.

The discharge slider 106 comprises a main discharge slider 106A, a sub-discharge slider 106B and a spring (first load means) 106C. The main discharge slider 106A and the sub-discharge slider 106B can slide in the longitudinal direction. The main discharge slider 106A and the sub-discharge slider 106B are biased by the spring 106C in a direction attracting each other. The main discharge slider 106A is formed at its one end with a cam groove 106E, and at its other end with a sliding groove 106F with respect to the sub-discharge slider 106B. The sub-discharge slider 106B is formed at its one end with a convex portion 106G which is engaged with the sliding groove 106F, and at its other end with a hole 106D corresponding to the pin 105C.

The main discharge slider 106A is formed at its other end with an engaging portion 106X comprising a concave portion. The sub-discharge slider 106B is formed at its one end with an engaging portion 106Y comprising a convex portion. The engaging portion 106X and the engaging portion 106Y constitute second load means.

With this above structure, in order to separate the main discharge slider 106A and the sub-discharge slider 106B from each other, a second load for separating the engaging portion 106X from the engaging portion 106Y is first required, and after the engaging portion 106X is separated from the engaging portion 106Y, a first load which acts against the spring 106C is required. That is, in order to separate the main discharge slider 106A and the sub-discharge slider 106B from each other, a load greater than the second load is required at an initial stage.

A motion state of the discharge slider when a disk is normally discharged and a motion state of the discharge slider when a forcibly pushing in load is applied when a disk is discharged will be explained below.

Figure 5:
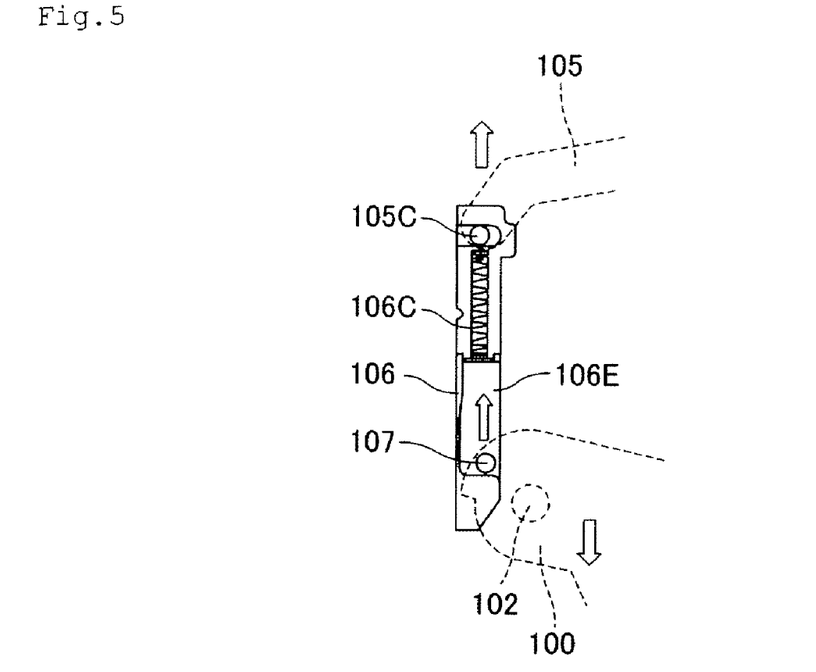
FIG. 5 is a plan view of an essential portion showing a motion state of the discharge slider when a disk is normally discharged.
Figure 6:
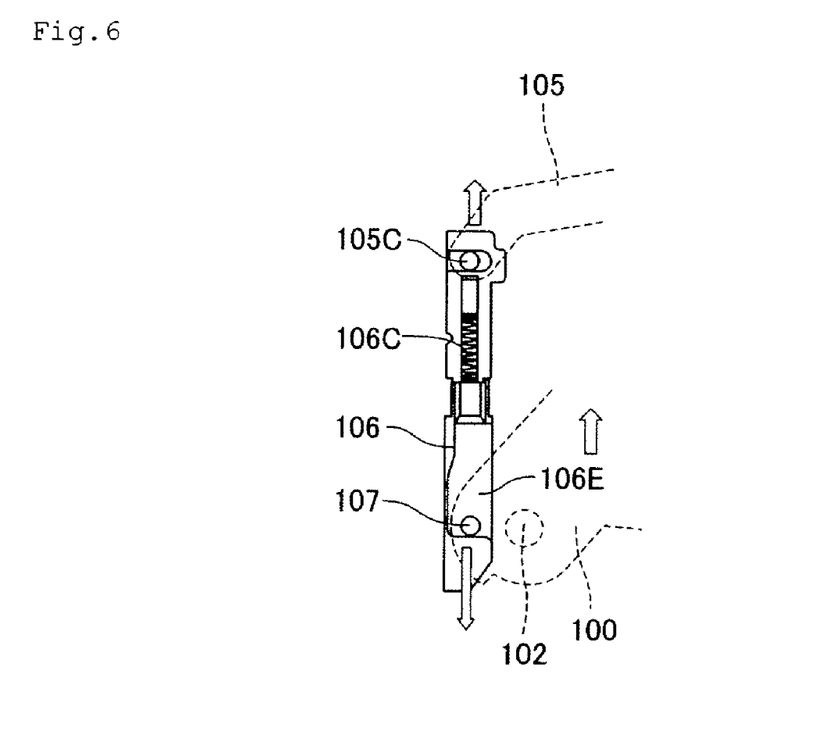
FIG. 6 is a plan view of an essential portion showing a motion state of the discharge slider when a forcibly pushing in load is applied when a disk is discharged.

FIG. 5 is a plan view of an essential portion showing the motion state of the discharge slider when a disk is normally discharged. FIG. 6 is a plan view of an essential portion showing the motion state of the discharge slider when a forcibly pushing in load is applied when a disk is discharged.

As shown in FIG. 5, when a disk is normally discharged, the pin 105C moves toward the rear surface of the turning motion of the link arm 105, and the discharge slider 106 also moves toward the rear surface. By this movement of the discharge slider 106, the cam pin 107 located in the cam groove 106E also moves toward the rear surface, and the discharge lever 100 turns around the rotation fulcrum 102. A disk is discharged by the turning motion of the discharge lever 100.

Next, when a load in a pushing direction of a disk is applied to the discharge lever 100 when the disk is discharged, the movable end of the discharge lever 100 turns toward the rear surface by the load applied to the disk as shown in FIG. 6. By the turning motion of the discharge lever 100, the cam pin 107 moves toward the front surface side in the direction opposite from the moving direction of the discharge slider 106. If the load applied to the cam pin 107 toward the front surface exceeds a predetermined level, the engaging portion 106X is separated from the engaging portion 106Y as shown in FIG. 3 and then, the spring 106C is compressed, the main discharge slider 106A and the sub-discharge slider 106B are separated from each other in accordance with the load applied to the cam pin 107.

According to the embodiment, when a load of the disk-pushing in direction is changed when the disk is discharged, the main discharge slider 106A and the sub-discharge slider 106B are separated from each other, it is possible to prevent a member such as the discharge slider 106 from being damaged.

According to the embodiment, since the initial load (second load) for separating the engaging portion 106X from the engaging portion 106Y is applied as a load for separating the main discharge slider 106A and the sub-discharge slider 106B from each other, the main discharge slider 106A and the sub-discharge slider 106B are not separated from each other by a small load applied when a disk is discharged. Therefore, it is possible to reliably discharge a disk when a light load such as surface friction or variation in size of the disk is applied.

Embodiment 2

Next, a disk apparatus according to another embodiment of the present invention will be explained.

Figure 7:
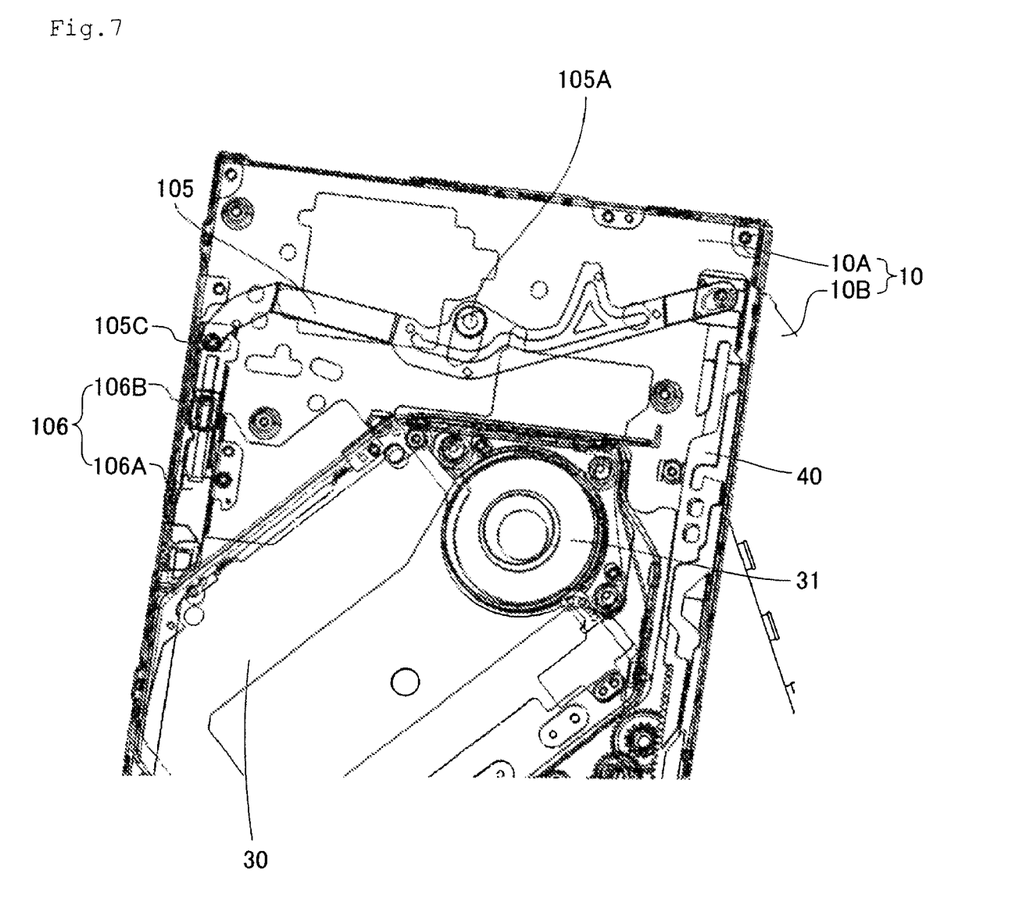
FIG. 7 is a perspective view of a base body of a disk apparatus according to another embodiment of the invention.

FIG. 7 is a perspective view of a base body of a disk apparatus according to another embodiment of the invention. The same members as those of the previous embodiment are designated with the same symbols, and only members which are required for description are illustrated.

A discharge slider 106 of this embodiment is the same as that of the previous embodiment except that the discharge slider 106 does not have the spring (first load means) 106C.

Therefore, the main discharge slider 106A and the sub-discharge slider 106B can slide in the longitudinal direction as shown in FIGS. 2 to 4. The main discharge slider 106A is formed at its one end with a cam groove 106E, and at the other end with a sliding groove 106F with respect to the sub-discharge slider 106B. The sub-discharge slider 106B is formed at its one end with a convex portion 106G which is engaged with the sliding groove 106F, and at its other end with a hole 106D corresponding to the pin 105C.

The main discharge slider 106A is formed at its other end with an engaging portion 106X comprising concave portion, and the sub-discharge slider 106B is formed at its one end with an engaging portion 106Y comprising convex portion. The engaging portion 106X and the engaging portion 106Y constitute the load means.

With this above structure, in order to separate the main discharge slider 106A and the sub-discharge slider 106B from each other, a load for separating the engaging portion 106X from the engaging portion 106Y is required.

This embodiment does not have the load means comprising the spring unlike the previous embodiment, after the engaging portion 106X is separated from the engaging portion 106Y, the main discharge slider 106A and the sub-discharge slider 106B are left separated from each other.

In this embodiment, the separated state between the main discharge slider 106A and the sub-discharge slider 106B is returned to its original state by pushing the main discharge slider 106A against another member such as the traverse base 30.

This motion will be explained below.

When a load in the pushing direction of a disk is applied to the discharge lever 100 when the disk is discharged, the movable end of the discharge lever 100 turns toward the rear surface by the load applied to the disk. The cam pin 107 is moved toward the front surface opposite from the moving direction of the discharge slider 106 by the turning motion of the discharge lever 100. If the load toward the front surface applied to the cam pin 107 exceeds a predetermined level, the engaging portion 106X is separated from the engaging portion 106Y, and the main discharge slider 106A and the sub-discharge slider 106B are separated from each other in accordance with the load of the cam pin 107. However, since the embodiment does not have the spring 106C, even if the load applied to the cam pin 107 is removed, the separated state between the main discharge slider 106A and the sub-discharge slider 106B is maintained.

However, if the discharge lever 100 turns through a predetermined amount of more by a load in the pushing direction of the disk, the disk abuts against the guide 112 of the restriction lever 110 and the restriction lever 110 turns.

If the restriction lever 110 turns through a predetermined angle, a limit switch is operated and the loading motor 60 starts driving. If the loading motor 60 is driven, the main slider 40 starts sliding toward the rear surface. If the main slider 40 moves, the pin 93 of the sub-lever 90 moves along the cam groove formed in the corresponding main slider 40. At that time, the pin 93 moves toward the spindle motor 31 by the corresponding cam groove. The sub-lever 90 biases the pull-in lever 80 in a direction in which the movable end of the pull-in lever 80 turns toward the spindle motor 31. The pull-in lever 80 biases a disk in the inserting direction. By this biasing force of the pull-in lever 80, the disk is separated from a manual operation and is further pushed in. The loading motor 60 keeps driving, and the main slider 40 also keeps the sliding motion toward the rear surface.

As a result of the motion, motion shown in FIG. 7 is carried out.

That is, if the main slider 40 moves, the link arm 105 turns around the shaft 105A. Therefore, the sub-discharge slider 106B moves toward the front surface. At that time, the main discharge slider 106A and the sub-discharge slider 106B do not approach each other and move by the friction of the engaging portion 106Y to the main discharge slider 106A. If the main discharge slider 106A abuts against another member such as the traverse base 30, since the main discharge slider 106A can not move, the main discharge slider 106A and the sub-discharge slider 106B gradually approach each other, and if the engaging portion 106Y moves to a position of the engaging portion 106X, the engaging portion 106Y and the engaging portion 106X are fitted to each other and they return to their original states.

According to this embodiment, if a load for pushing a disk in is applied when the disk is discharged, the main discharge slider 106A and the sub-discharge slider 106B are separated from each other. Therefore, it is possible to prevent a member such as the discharge slider 106 from being damaged.

Further, according to the embodiment, the separated state between the main discharge slider 106A and the sub-discharge slider 106B can be returned to the original state by abutting the main discharge slider 106A against the other member such as the traverse base 30. Therefore, the returning motion when a load in the pushing direction of a disk is removed can be carried out smoothly without provided load means such as a spring.

This application is based upon and claims the benefit of priority of Japanese Patent Application NO. 2006-26566 filed on Feb. 3, 2006, the contents of which are incorporated herein by reference in its entirety.

INDUSTRIAL APPLICABILITY

In a disk apparatus for recording or replaying into or from a disk-like recording medium such as a CD and a DVD, the present invention can be utilized for a disk apparatus which is used as a domestic video device or a peripheral device of a computer, and which needs to be reduced in thickness.

The invention claimed is:

1. A slot-in type disk apparatus, comprising:
a chassis sheath that is comprised of a base body and a lid,
a disk-insertion opening into which a disk is to be directly inserted is formed in a front surface of the chassis sheath,
a traverse base disposed on a front surface side of the base body,
a main slider provided with a cam mechanism which displaces the traverse base, wherein the main slider is configured such that one end is on the front surface side of the base body and another end is on a rear surface side of the base body,
a discharge slider provided parallel to the main slider, wherein the main slider and the discharge slider are connected to each other through a link arm, and
a discharge lever configured in association with motion of the main slider through the discharge slider, wherein
the discharge slider is constituted by a main discharge slider and a sub-discharge slider, wherein first load means and second load means are provided in the main discharge slider and the sub-discharge slider and are configured such that when a load in a direction in which the disk is pushed in is applied to the discharge lever when the disk is discharged, a load caused by the second load means is applied to the main discharge slider and the sub-discharge slider, and a load caused by the first load means is applied to the main discharge slider and the sub-discharge slider after the load caused by the second load means is released, and wherein
the main discharge slider and the sub-discharge slider are configured to slide in a longitudinal direction, with the main discharge slider and the sub-discharge slider being biased in a direction in which they attract each other by the first load means,
the main discharge slider and the sub-discharge slider are formed with engaging portions, which constitutes the second load means, the main slider and the discharge slider are parallel to each other, the discharge slider comprises a spring as the first load means, and the main discharge slider and the sub-discharge slider are biased by the spring in a direction attracting each other.

2. A slot-in type disk apparatus, comprising:

a chassis sheath that is comprised of a base body and a lid, a disk-insertion opening into which a disk is to be directly inserted is formed in a front surface of the chassis sheath, a traverse base disposed on a front surface side of the base body, a main slider and a sub-slider provided with cam mechanisms which displace the traverse base, wherein the main slider is configured such that one end is on the front surface side of the base body and another end is on a rear surface side of the base body, a discharge slider provided parallel to the main slider, wherein the main slider and the discharge slider are connected to each other through a link arm, and a discharge lever configured in association with motion of the main slider through the discharge slider, wherein the discharge slider is constituted by a main discharge slider and a sub-discharge slider, which are configured to slide in a longitudinal direction, with the main discharge slider and the sub-discharge slider being formed with engaging portions, thereby constituting load means, and the load means are configured such that when a load in a direction in which the disk is pushed in is applied to the discharge lever when the disk is discharged, a load caused by the load means is applied to the main discharge slider and the sub-discharge slider, and wherein the main discharge slider and the sub-discharge slider are configured such that a separated state between the main discharge slider and the sub-discharge slider is brought into a fitted state between the main discharge slider and the sub-discharge slider by abutting the main discharge slider against the traverse base, and the discharge lever is configured such that when a load in a pushing direction of a disk is applied to the discharge lever when the disk is discharged, the engaging portion of the main discharge slider is separated from the engaging portion of the sub-discharge slider, a spring comprising a part of the load means is compressed.

* * * * *